United States Patent
Kubo

(10) Patent No.: US 7,388,513 B2
(45) Date of Patent: Jun. 17, 2008

(54) DRIVING STATE DETERMINING SYSTEM

(75) Inventor: Shunitsu Kubo, Anjo (JP)

(73) Assignee: DENSO CORPORATION, Kariya (JP)

( * ) Notice: Subject to any disclaimer, the term of this patent is extended or adjusted under 35 U.S.C. 154(b) by 242 days.

(21) Appl. No.: 11/151,444

(22) Filed: Jun. 14, 2005

(65) Prior Publication Data

US 2005/0280520 A1   Dec. 22, 2005

(30) Foreign Application Priority Data

Jun. 16, 2004   (JP) .............................. 2004-178581

(51) Int. Cl.
   *G08G 1/16*   (2006.01)
(52) U.S. Cl. ...................... 340/903; 340/435; 340/438
(58) Field of Classification Search ................ 340/439, 340/436, 438, 575, 576, 435, 903, 905, 425.5
   See application file for complete search history.

(56) References Cited

U.S. PATENT DOCUMENTS

| | | | | |
|---|---|---|---|---|
| 5,165,497 | A * | 11/1992 | Chi | 180/169 |
| 6,067,031 | A * | 5/2000 | Janky et al. | 340/903 |
| 6,289,332 | B2 * | 9/2001 | Menig et al. | 707/1 |
| 6,756,916 | B2 * | 6/2004 | Yanai | 340/936 |
| 6,831,572 | B2 * | 12/2004 | Strumolo et al. | 340/903 |
| 7,009,500 | B2 * | 3/2006 | Rao et al. | 340/435 |
| 2003/0055563 | A1 * | 3/2003 | Jonas Lars et al. | 701/301 |
| 2004/0059487 | A1 | 3/2004 | Lich et al. | |

FOREIGN PATENT DOCUMENTS

| | | |
|---|---|---|
| JP | A-2-246838 | 10/1990 |
| JP | A-5-242396 | 9/1993 |
| JP | A-6-119599 | 4/1994 |
| JP | A-9-175327 | 7/1997 |
| JP | A-10-151959 | 6/1998 |
| JP | A-2000-247211 | 9/2000 |
| JP | A-2003-291758 | 10/2003 |

\* cited by examiner

*Primary Examiner*—Brent A. Swarthout
(74) *Attorney, Agent, or Firm*—Posz Law Group, PLC

(57) ABSTRACT

A driving state determining system in a vehicle recognizes an obstruction that may collide with the vehicle based on obtained various information. The system executes a plurality of danger determinations that have individual determination conditions, based on a relative distance and a relative speed with the obstruction to thereby comprehensively determine one of danger regions that the vehicle is situated in. The danger regions are classified depending on a danger degree. The system then outputs a determined result to relevant devices. Each of the relevant devices thereby determines operation by obtaining the comprehensively determined result outputted by the system. Consequently, the relevant devices can function more cooperatively and more effectively to lead to increase in safety than another system where each of relevant devices determines operation by individually collecting information.

12 Claims, 6 Drawing Sheets

DRIVING STATE DETERMINING SYSTEM

CROSS REFERENCE TO RELATED APPLICATIONS

This application is based on and incorporates herein by reference Japanese Patent Application No. 2004-178581 filed on Jun. 16, 2004.

FIELD OF THE INVENTION

The present invention relates to a driving state determining system that determines driving states based on information from various in-vehicle sensors or the like to thereby output determination results.

BACKGROUND OF THE INVENTION

A safety system called Pre-Crash Safety System starts to come into practical use. This system determines beforehand a subject vehicle's state where a collision is unavoidable to thereby promptly activate safety equipment for decreasing collision damage (refer to Patent Document 1). In detail, a detector such as a millimeter wave radar detects a position, a distance, a speed, or the like of an obstruction ahead of a subject vehicle. When it is determined that collision with this obstruction is unavoidable, a seatbelt for a driver's seat or a driver-assistance's seat is fastened just before the collision so that fixation of an occupant is secured. Further, stepping of a braking pedal is detected to cause an enforced braking force. Avoidance of the collision or protection of occupants at the collision can be thereby achieved.

Patent Document 1: JP-2000-247211 A

A conventional safety system such as the above works after a collision with an obstruction is determined to be unavoidable. Therefore, the system does not function for a purpose that a driver recognizes a danger beforehand to thereby conduct an operation for preventing the accident from occurring. A state where this safety system works is a last stage for collision avoidance or occupant protection. Activating this safety system may give an occupant discomfort or involve a rear-end collision with a following vehicle. It is therefore preferable that a driver conducts a proper operation before the above safety system is activated.

Analysis of causes of recent traffic accidents indicates that head-on collisions at intersections and rear-end collisions in straight roads account for the first and second largest portions, respectively. The above-described safety system detects danger of collision when a millimeter wave radar mounted in the front of a vehicle detects an obstruction. Therefore, the system only responds to an obstruction (a preceding vehicle, an on-road obstruction, or an oncoming vehicle) ahead of the subject vehicle, which is limited to uses in straight roads. In sum, the system does not function against head-on collisions at intersections.

SUMMARY OF THE INVENTION

It is an object of the present invention to provide a driving state determining system to solve the above problem. The system determines a present driving state as one of multiple danger states and causes a driver to recognize one of the danger states and thereby rapidly conduct operation for preventing the corresponding danger state.

To achieve the above object, a driving state determining system in a vehicle is provided with the following. An obtaining unit is included for obtaining information including vehicle information of the vehicle and surrounding information for understanding a state surrounding the vehicle. A determining unit is included for recognizing an obstruction that has a possibility of colliding with the vehicle based on the information and for executing a plurality of danger determinations that have individual determination conditions, based on a relative distance between the vehicle and the obstruction and a relative speed between the vehicle and the obstruction. An outputting unit is further included for outputting to other devices a signal based on a result of a danger determination executed by the determining unit.

Under this structure, a plurality of danger determinations (or region determinations) having individual determining conditions are executed with respect to an obstruction based on a relative distance and a relative speed between a subject vehicle and an obstruction. Accordingly, various driving states are determined. The driving states include, e.g., (i) a state where a driver needs to be warned, (ii) a state where an operation for avoiding or preventing danger needs to be started, and (iii) a state where an operation for anticipating or responding to a possible collision needs to be executed. Then a signal based on a determined result is sent to other relevant devices to thereby cause the relevant devices to properly conduct operation (notifying for drawing attention of a driver, assisting an operation for avoiding the danger, or protecting an occupant). Here, the driving states are determined by synthesizing various information; then signals for activating other devices or signals for determining whether other devices should start are comprehensively outputted. Therefore, this system is more effective and other devices more cooperatively work, than a system where each of other devices determines an operation by individually collecting information.

As another aspect of the present invention, to achieve the above object, a driving state determining system in a vehicle is provided with the following. An obtaining unit is included for obtaining information including vehicle information of the vehicle and surrounding information for understanding a state surrounding the vehicle. A determining unit is included for recognizing a point where the vehicle needs to stop based on the information and for executing a plurality of danger determinations that have individual determination conditions, based on a distance between the vehicle and the point and a speed of the vehicle. An outputting unit is further included for outputting to other devices a signal based on a result of a danger determination executed by the determining unit.

Under this structure, a plurality of danger determinations (or region determinations) having individual determining conditions are executed with respect to a temporary-stop-required position based on a distance to the temporary-stop-required position and a speed of a subject vehicle. Accordingly, various driving states are determined. The driving states include, e.g., (i) a state where a driver needs to be warned, (ii) a state where a stop operation needs to be started, and (iii) a state where an emergency stop needs to be operated. Then a signal based on a determined result is sent to other relevant devices to thereby cause the relevant devices to properly conduct operation (notifying for drawing attention of a driver, assisting an operation for stopping the subject vehicle, or executing an emergency stop). Here, the driving states are determined by synthesizing various information; then signals for activating other devices or signals for determining whether other devices should start are comprehensively outputted. Therefore, this system is more effective and other devices more cooperatively work, than a system where each of other devices determines an operation by individually collecting information.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
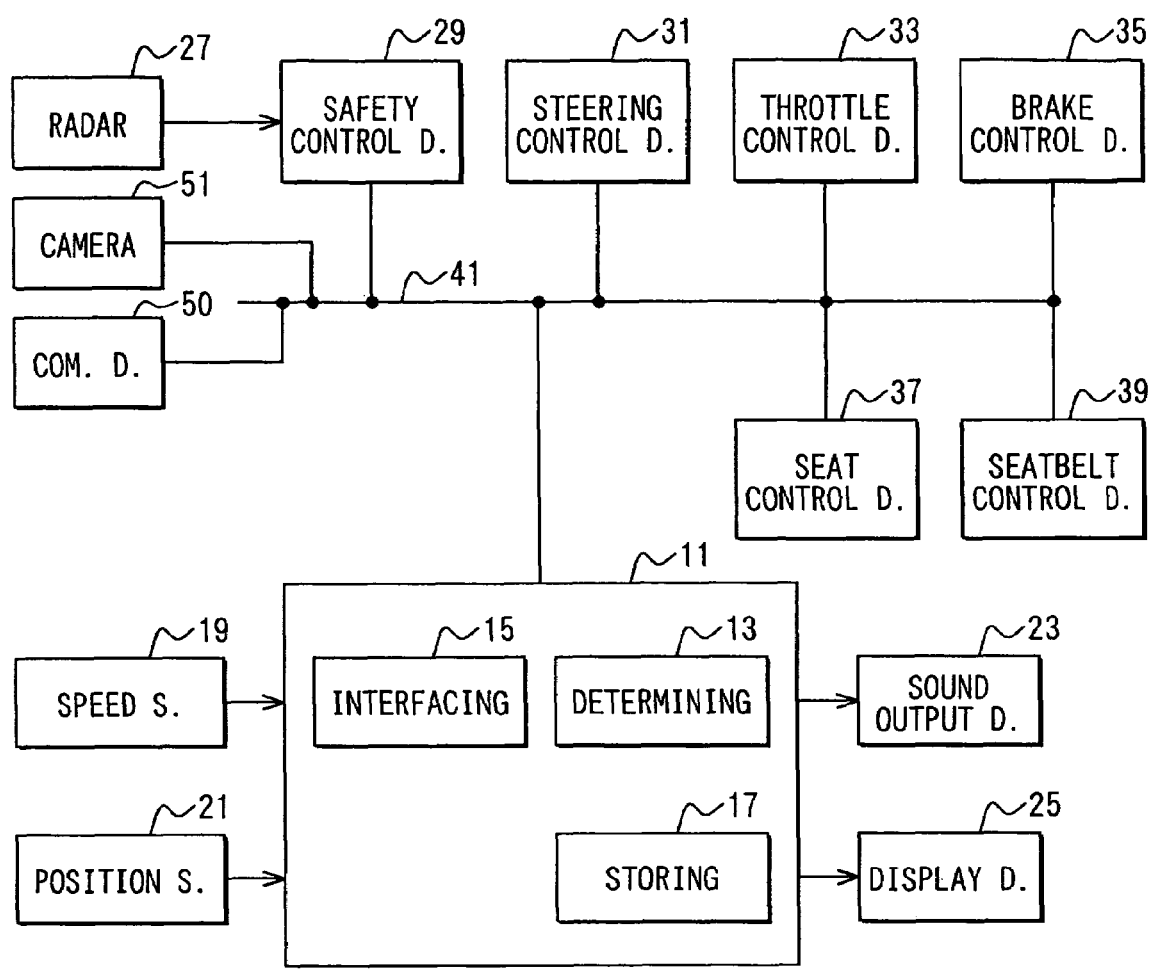
FIG. 1 is a block diagram of a navigation device and its peripheral devices.

A driving state determining system according to an embodiment of the present invention is adapted to a navigation device 11. FIG. 1 shows a block diagram of the navigation device 11 and its peripheral devices, all of which are mounted in a subject vehicle. The navigation device 11 connects with a speed sensor 19, a position sensor 21, a sound output device 23, a display device 25, and an in-vehicle LAN 41.

The speed sensor 19 is disposed in a hub of a wheel assembly or the like to detect a vehicle speed and output a detection result to the navigation device 11. The position sensor 21 includes a GPS (Global Positioning System) antenna, and a gyroscope to output to the navigation device 11 information necessary for computing a present position or information enabling understanding of driving states of the subject vehicle. The sound output device 23 includes a speaker and an amplifier to output sounds based on signals from the navigation device 11. The display device 25 includes a liquid crystal display or an organic electro luminescent display to output images based on signals from the navigation device 11.

The navigation device 11 includes a determining unit 13, an interfacing unit 15, and storing unit 17. The determining unit 13 includes a CPU, a ROM, a RAM, and a bus connecting the foregoing components (non shown). The CPU of the determining unit 13 executes a given program to thereby achieve various functions such as a route guiding function. The interfacing unit 15 includes a communications-purpose microcomputer (not shown) to communicate with sensors or the like directly connected with the navigation device 11 or the devices connected via the in-vehicle LAN 41 with the navigation device 11. The storing unit 17 includes a storage medium such as a hard disk, a DVD-ROM, or a memory card, and an access unit that accesses to the storage medium. The storage medium stores map data, sound data, various programs, or the like. The in-vehicle LAN 41 connects with at least a pre-crash safety control device 29, a steering control device 31, a throttle control device 33, a brake control device 35, a seat control device 37, and a seatbelt control device 39.

The pre-crash safety control device 29 determines beforehand a subject vehicle's driving state that a collision is unavoidable and then promptly activates safety equipment to thereby decrease damage due to the collision. The pre-crash safety control device 29 includes a CPU, a ROM, a RAM, and a bus connecting the foregoing components (non shown). The CPU of the pre-crash safety control device 29 executes a program to thereby achieve the above function. The pre-crash safety control device 29 connects with a forward radar 27 that is mounted in the front portion of the subject vehicle to output millimeter waves for detecting obstructions. The pre-crash safety control device 29 thereby receives detection results from the forward radar 27 and outputs the detection results to the in-vehicle LAN 41.

The steering control device 31 controls a function of assisting a driver to steer the vehicle and a function of causing a driver to recognize abnormality by vibrating a steering wheel. The steering control device 31 further detects steering states (or steering angles).

The throttle control device 33 controls an engine throttle and detects throttle states (or opening degrees).

The brake control device 35 controls a brake booster or a brake actuator to mainly adjust a relationship between a driver's stepping force and a braking force. The brake control device 35 causes the brake booster or the like to increase a braking force more than usual in an emergency; further, the brake control device 35 forcibly causes the brake booster or the like to increase a braking force in a state that a collision is unavoidable.

The seat control device 37 controls an electromotive motor for power seats or the like and further controls a function of causing a driver to recognize abnormality by vibrating a seat.

The seatbelt control device 39 controls a motor fastening a seatbelt.

Next, various process executed by the determining unit 13 or the pre-crash safety control device 29 will be explained below. The determining unit 13 executes (1) region determining process for an obstruction and (2) region determining process for a temporary stop. The pre-crash safety control device 29 executes (3) obstruction-responding process and (4) temporary stop-responding process. Usual process by a navigation device such as a route guiding process is not explained here.

Figure 2:
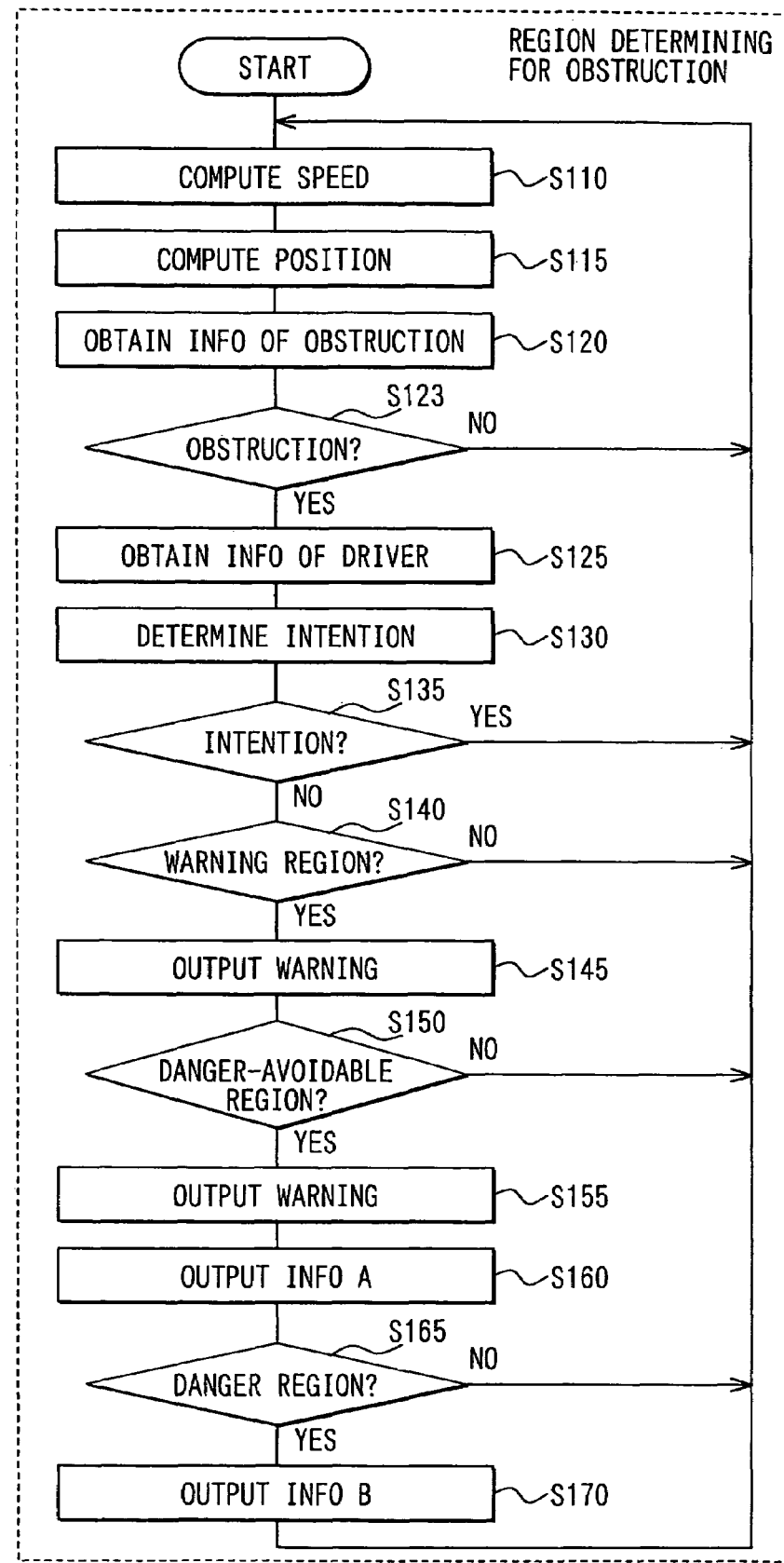
FIG. 2 is a flowchart diagram of a region determination process with respect to an obstruction.

(1) Region Determining Process for Obstruction (Refer to FIG. 2)

The determining unit 13 starts this process when an ignition of the subject vehicle is turned on. Firstly, at Step S110, a vehicle speed is computed based on signals inputted from the speed sensor 19. At Step S115, a position of the subject vehicle is computed based on information inputted from the position sensor 21. At Step S120, information of a forward obstruction ahead of the subject vehicle is obtained from the pre-crash safety control device 29 via the in-vehicle LAN 41. This information includes a relative distance or a relative speed with the obstruction (or vehicle). Here, an obstruction includes any one interfering with traveling of a vehicle such as a fallen object, a traffic sign, a guardrail, or a vehicle (parked vehicle, traveling vehicle).

At Step S123, it is determined whether an obstruction that has a possibility of colliding with the subject vehicle is present based on the information obtained at the preceding process at Steps S110, S115, and S120. When an obstruction that has a possibility of colliding with the subject vehicle is determined to be present, the sequence goes to S125. When an obstruction that has a possibility of colliding with the subject vehicle is determined not to be present, the sequence returns to S110.

At Step S125, given information is obtained via the in-vehicle LAN 41. This given information includes (i)

information of how the driver operates the steering, from the steering control device 31, (ii) information of how the driver operates the throttle, from the throttle control device 33, (iii) information of how the driver operates the brake, from the brake control device 35.

At Step S130, it is determined whether the driver intends to avoid an obstruction having a possibility of colliding with the subject vehicle based on the information computed or obtained at Steps S110, S115, S120, and S125. This determination can be executed by various methods as follows. When the driver operates to avoid a traveling course to lead to collision with an obstruction or operates to decrease the speed as approaching the obstruction, it is determined that the driver has an intention of avoidance. When the driver does not conduct such the operation, it is determined that the driver has no intention of avoidance.

At Step S135, the sequence is branched depending on the determination result at Step S130. When the driver has an intension of avoiding an obstruction, the sequence returns to S110. When the driver has no intension of avoiding an obstruction, the sequence goes to S140.

Figure 6A:
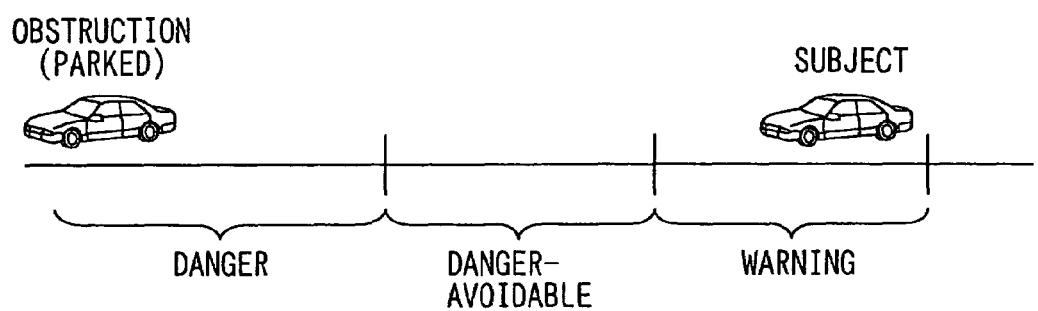
FIGS. 6A, 6B are views showing region images.

At Step S140, it is determined whether the subject vehicle enters a warning region, which will be explained with reference to FIG. 6A as follows. This warning region is, for instance, within 50 meters short of an avoidance-required position in an approaching direction with respect to an obstruction (a parked vehicle in FIG. 6A). The avoidance-required position is a position from which the driver needs to start an operation for avoiding an obstruction. Within the warning region before reaching this avoidance-required position, the vehicle or the driver is in a state where the driver needs to at least recognize the presence of the obstruction. This warning region varies depending on a vehicle speed. When the subject vehicle enters the warning region, the sequence goes to Step S145. When the subject vehicle does not enter the warning region, the sequence returns to Step S110.

At Step S145, the sound output device 23 is sent a signal and caused to output a sound that causes the driver to recognize the presence of the obstruction or that draws attention of the driver. For instance, the sound is "An obstruction regarded as a parked vehicle is present 100 meters ahead. Please operate for avoidance." The display device 25 is also sent the signal and caused to display an image indicating positions of the subject vehicle and the obstruction on a map.

At Step S150, it is determined whether the subject vehicle enters a danger avoidable region, which will be explained with reference to FIG. 6A as follows. This danger avoidable region is, for instance, in the approaching direction with respect to the obstruction, from the avoidance-required position to a danger-unavoidable position. The danger-unavoidable position is a position from which a collision cannot be avoided even if the driver starts an operation for avoiding the obstruction. In other words, within this danger-avoidable region, the subject vehicle or the driver is in a state where a danger can be avoided when the driver starts an operation for avoiding the obstruction, but the danger cannot be avoided when the driver starts no operation for avoiding the obstruction. When the subject vehicle enters the danger-avoidable region, the sequence goes to Step S155. When the subject vehicle does not enter the danger-avoidable region, the sequence returns to Step S110.

At Step S155, the sound output device 23 is sent a signal and caused to output a sound to cause the driver to rapidly start a danger-avoidance operation. For instance, the sound is "Danger. Decelerate. An obstruction regarded as a parked vehicle is present ahead." To avoid a danger more effectively, the sound is preferably outputted in an order of causing the presence of the danger to be recognized, indicating the next operation, and then explaining the reason. The display device 25 is also sent the signal and caused to display, for instance, a blinking image of characters indicating braking operation. Further, the steering control device 31 is sent a signal for vibrating the steering wheel, while the seat control device 37 is sent a signal for vibrating the seat.

At Step S160, danger information A is outputted to the pre-crash safety control device 29 via the in-vehicle LAN 41. This danger information A includes at least (i) information indicating that the subject vehicle enters a danger-avoidable region, (ii) information indicating a position of an obstruction having a possibility of colliding with the subject vehicle, and (iii) information indicating a speed and a position of the subject vehicle.

At Step S165, it is determined whether the subject vehicle enters a danger region, which will be explained with reference to FIG. 6A as follows. This danger region is, for instance, from a final (or limit) position of the danger-avoidable region to the obstruction. Within the danger region, the vehicle or the driver is in a state where the collision cannot be avoided by an ordinary braking function operated by the driver. When the subject vehicle enters the danger region, the sequence goes to Step S170. When the subject vehicle does not enter the danger region, the sequence returns to Step S110.

At Step S170, danger information B is outputted to the pre-crash safety control device 29 via the in-vehicle LAN 41. This danger information B includes at least (i) information indicating that the subject vehicle enters a danger region, (ii) information indicating a position of an obstruction having a possibility of colliding with the subject vehicle, and (iii) information indicating a speed and a position of the subject vehicle. After the danger information B is outputted, the sequence returns to Step S110.

Figure 3:
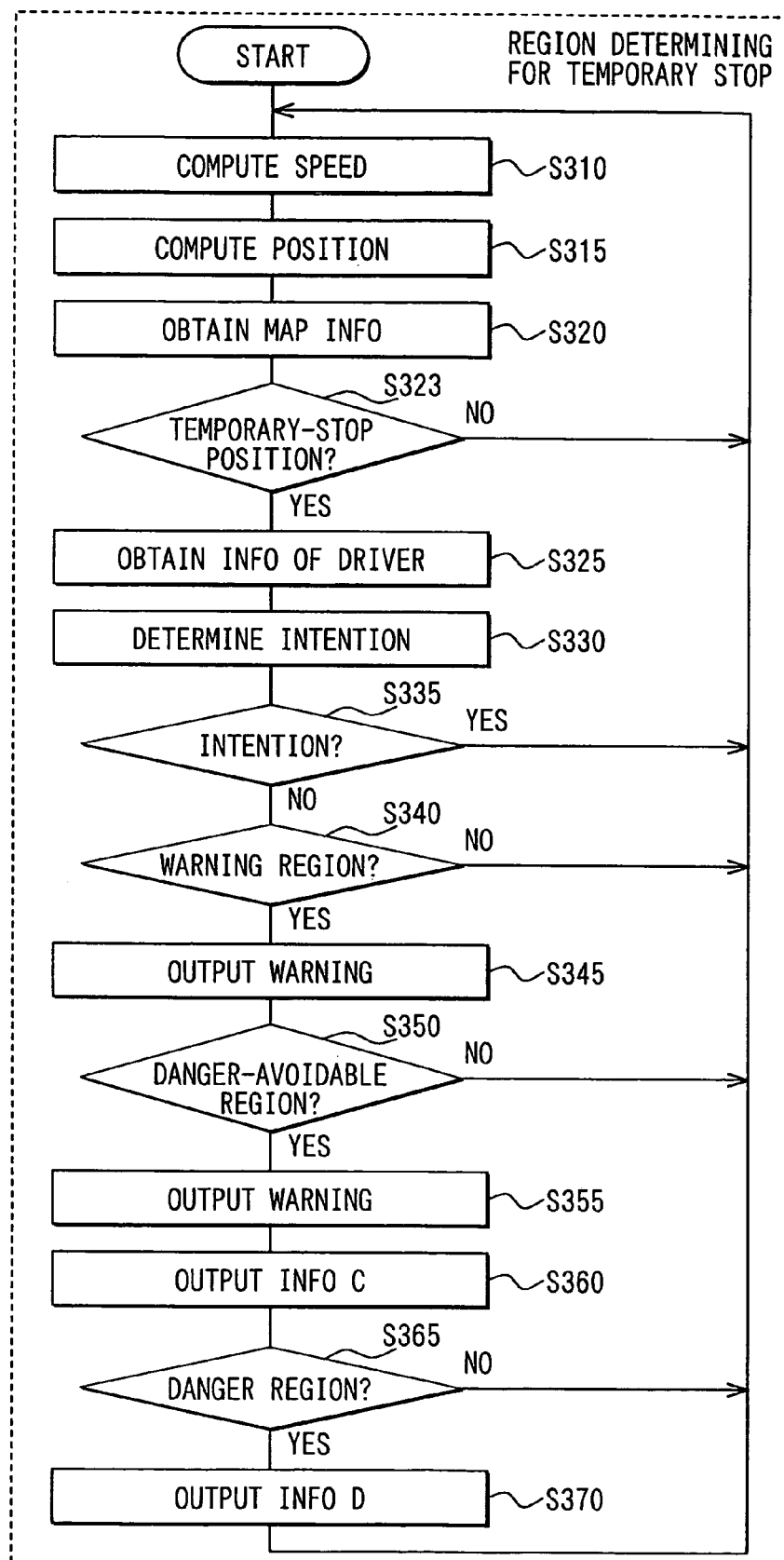
FIG. 3 is a flowchart diagram of a region determination process with respect to a temporary stop.

(2) Region Determining Process for Temporary Stop (Refer to FIG. 3)

The determining unit 13 starts a region determining process for a temporary stop when an ignition of the subject vehicle is turned on. Here, the determining unit 13 executes this process independently, regardless of execution of the above region determining process for an obstruction. Firstly, at Step S310, a vehicle speed is computed based on signals inputted from the speed sensor 19. At Step S315, a position of the subject vehicle is computed based on information inputted from the position sensor 21. At Step S320, map information (in detail, information of presence or absence of a temporary stop) is obtained from the storing unit 17.

At Step S323, it is determined whether a temporary-stop-required position where the subject vehicle needs to temporarily stop is present within a given distance from a present position of the subject vehicle (e.g., within 100 meters at 40 km/h) based on the information obtained at the preceding process at Steps S310, S315, and S320. When a temporary-stop-required position is determined to be present within the given distance, the sequence goes to S325. When a temporary-stop-required position is determined not to be present within the given distance, the sequence returns to S310.

At Step S325, given information is obtained via the in-vehicle LAN 41. This given information includes (i) information of how the driver operates the steering, from the steering control device 31, (ii) information of how the driver operates the throttle, from the throttle control device 33, (iii) information of how the driver operates the brake, from the brake control device 35.

At Step S330, it is determined whether the driver intends to stop at the temporary-stop-required position based on the information computed or obtained at Steps S310, S315, S320, and S325. This determination can be executed by various methods as follows. It can be determined whether the driver releases stepping of an accelerator pedal, or whether the driver steps on the braking pedal for temporarily stopping.

At Step S335, the sequence is branched depending on the determination result at Step S330. When the driver has an intension of temporarily stopping, the sequence returns to S310. When the driver has no intension of temporarily stopping, the sequence goes to S340.

Figure 6B:
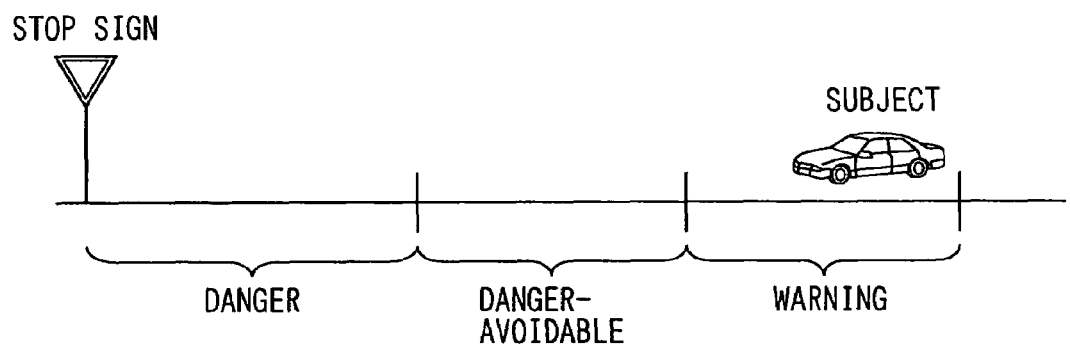

At Step S340, it is determined whether the subject vehicle enters a warning region, which will be explained with reference to FIG. 6B as follows. This warning region is, for instance, within 50 meters short of an operation-required position in an approaching direction with respect to a temporary-stop-required position (a stop sign in FIG. 6B). The operation-required position is a position from which the driver needs to start an operation (e.g., releasing stepping on the accelerator pedal) for temporarily stopping the vehicle. Within the warning region, the vehicle or the driver is in a state where the driver needs to at least recognize the presence of the temporary-stop-required position. This warning region varies depending on a vehicle speed. When the subject vehicle enters the warning region, the sequence goes to Step S345. When the subject vehicle does not enter the warning region, the sequence returns to Step S310.

At Step S345, the sound output device 23 is sent a signal and caused to output a sound causing the driver to recognize the presence of the temporary-stop-required position. For instance, the sound is "An intersection where this vehicle needs to temporarily stop is present 100 meters ahead. Please operate for stopping." The display device 25 is also sent the signal and caused to display an image indicating positions of the subject vehicle and the temporary-stop-required position on a map.

At Step S350, it is determined whether the subject vehicle enters a danger-avoidable region, which will be explained with reference to FIG. 6B as follows. This danger-avoidable region is, for instance, from the operation-required position to a stop-impossible position in the approaching direction with respect to the temporary-stop-required position. The stop-impossible position is a position from which the vehicle cannot stop at the temporary-stop-required position even if the driver starts an operation for stopping the vehicle. Within this danger-avoidable region, the vehicle or the driver is in a state where a temporary stop can be completed when the driver starts an operation for stopping, but the temporary stop cannot be completed when the driver starts no operation for stopping. When the subject vehicle enters the danger-avoidable region, the sequence goes to Step S355. When the subject vehicle does not enter the danger-avoidable region, the sequence returns to Step S310.

At Step S355, the sound output device 23 is sent a signal and caused to output a sound to cause the driver to rapidly start a temporary-stop operation. For instance, the sound is "Danger. Decelerate. An intersection needing a temporary stop is present ahead." To avoid a danger more effectively, the sound is preferably outputted in an order of causing the presence of the danger to be recognized, indicating the next operation, and then explaining the reason. The display device 25 is also sent the signal and caused to display, for instance, a blinking image of characters indicating braking operation. Further, the steering control device 31 is sent a signal for vibrating the steering wheel, while the seat control device 37 is sent a signal for vibrating the seat.

At Step S360, danger information C is outputted to the pre-crash safety control device 29 via the in-vehicle LAN 41. This danger information C includes at least information indicating that the subject vehicle enters a danger-avoidable region.

At Step S365, it is determined whether the subject vehicle enters a danger region, which will be explained with reference to FIG. 6B as follows. This danger region is, for instance, from a final (or limit) position of the danger-avoidable region to the temporary-stop-required position. Within this danger region, the temporary stop at the temporary-stop-required position cannot be completed by an ordinary braking function operated by the driver. When the subject vehicle enters the danger region, the sequence goes to Step S370. When the subject vehicle does not enter the danger region, the sequence returns to Step S310.

At Step S370, danger information D is outputted to the pre-crash safety control device 29 via the in-vehicle LAN 41. This danger information D includes at least information indicating that the subject vehicle enters a danger region. After the danger information D is outputted, the sequence returns to Step S310.

Figure 4:
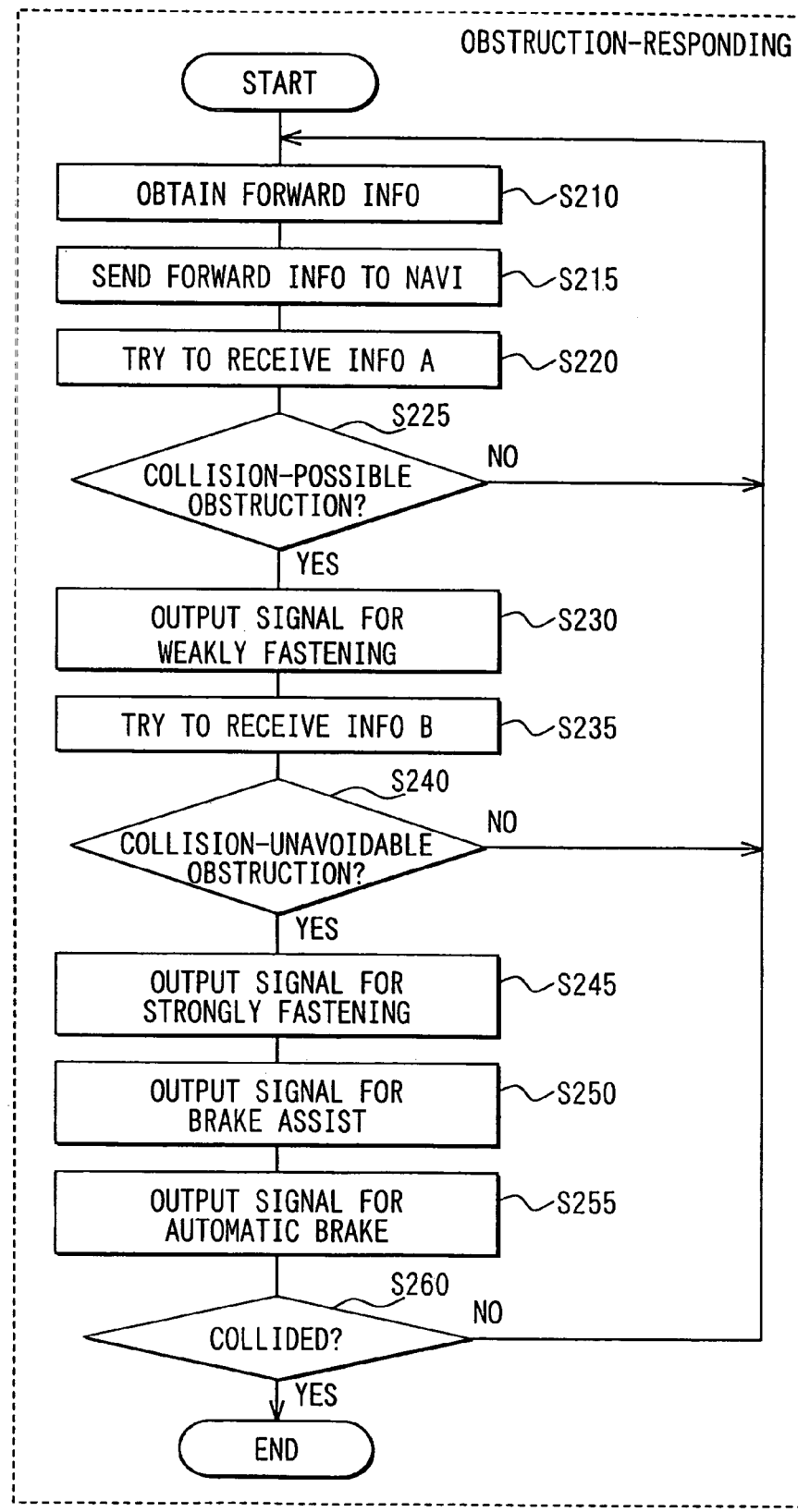
FIG. 4 is a flowchart diagram of a process responding to an obstruction.

(3) Obstruction-responding Process (Refer to FIG. 4)

An obstruction-responding process is executed by the pre-crash safety control device 29. The pre-crash safety control device 29 starts this process when an ignition of the subject vehicle is turned on. Firstly, at Step S210, forward-obstruction information relating to a forward obstruction ahead of the subject vehicle is obtained from the forward radar 27. This information includes a relative distance or a relative speed with the obstruction (or vehicle). Here, this information relates to any obstruction that is detected forward regardless of possibility of colliding with it.

At Step S215, the forward-obstruction information is sent to the navigation device 11 via the in-vehicle LAN 41. At Step S220, receiving the danger information A sent from the navigation device 11 via the in-vehicle LAN 41 is tried. As explained above, the danger information A includes at least (i) information indicating that the subject vehicle enters a danger-avoidable region, (ii) information indicating a position of an obstruction having a possibility of colliding with the subject vehicle, and (iii) information indicating a speed and a position of the subject vehicle. Even when the danger information A is not received, the sequence goes to Step S225.

At Step S225, it is determined whether an obstruction that has a possibility of colliding with the subject vehicle is present based on the forward-obstruction information and the danger information A (if received at Step S220). When an obstruction having a possibility of colliding with the subject vehicle is determined to be present, the sequence goes to S230. When an obstruction having a possibility of colliding with the subject vehicle is determined not to be present, the sequence returns to S210.

At Step S230, a signal for weakly fastening the seatbelt is sent to the seatbelt control device 39 via the in-vehicle LAN 41. The seatbelt control device 39 receives this signal to thereby operate a seatbelt fastening motor so that the driver recognizes fastening of the seatbelt.

At Step S235, receiving the danger information B sent from the navigation device 11 via the in-vehicle LAN 41 is tried. As explained above, the danger information B includes at least (i) information indicating that the subject vehicle enters a danger region, (ii) information indicating a position of an obstruction having a possibility of colliding with the subject vehicle, and (iii) information indicating a speed and a position of the subject vehicle.

At Step S240, it is determined whether an obstruction that may unavoidably collide with the subject vehicle is present based on the forward-obstruction information and the danger information B (if received at Step S235). When an obstruction that may unavoidably collide with the subject vehicle is determined to be present, the sequence goes to S245. When an obstruction that may unavoidably collide with the subject vehicle is determined not to be present, the sequence returns to S210.

At Step S245, a signal for strongly fastening the seatbelt is sent to the seatbelt control device 39 via the in-vehicle LAN 41. The seatbelt control device 39 receives this signal to thereby operate the seatbelt fastening motor so that the driver can be fixed to the seat.

At Step S250, a signal is outputted for causing the brake control device 35 to execute a braking assist operation via the in-vehicle LAN 41. The brake control device 35 receives this signal to thereby cause the braking system to work so that a braking force with respect to the driver's braking operation is increased to more than a usual force.

At Step S255, a signal is outputted for causing the brake control device 35 to execute an automatic braking operation via the in-vehicle LAN 41. The brake control device 35 receives this signal to thereby cause the braking system to work so that a maximum braking force is attained regardless of the driver's braking operation.

At Step S260, it is determined whether the subject vehicle collides with the obstruction based on information from the acceleration sensor or the like. When the subject vehicle collides with the obstruction, the process ends. When the subject vehicle does not collide with the obstruction, the sequence returns to Step S210.

Figure 5:
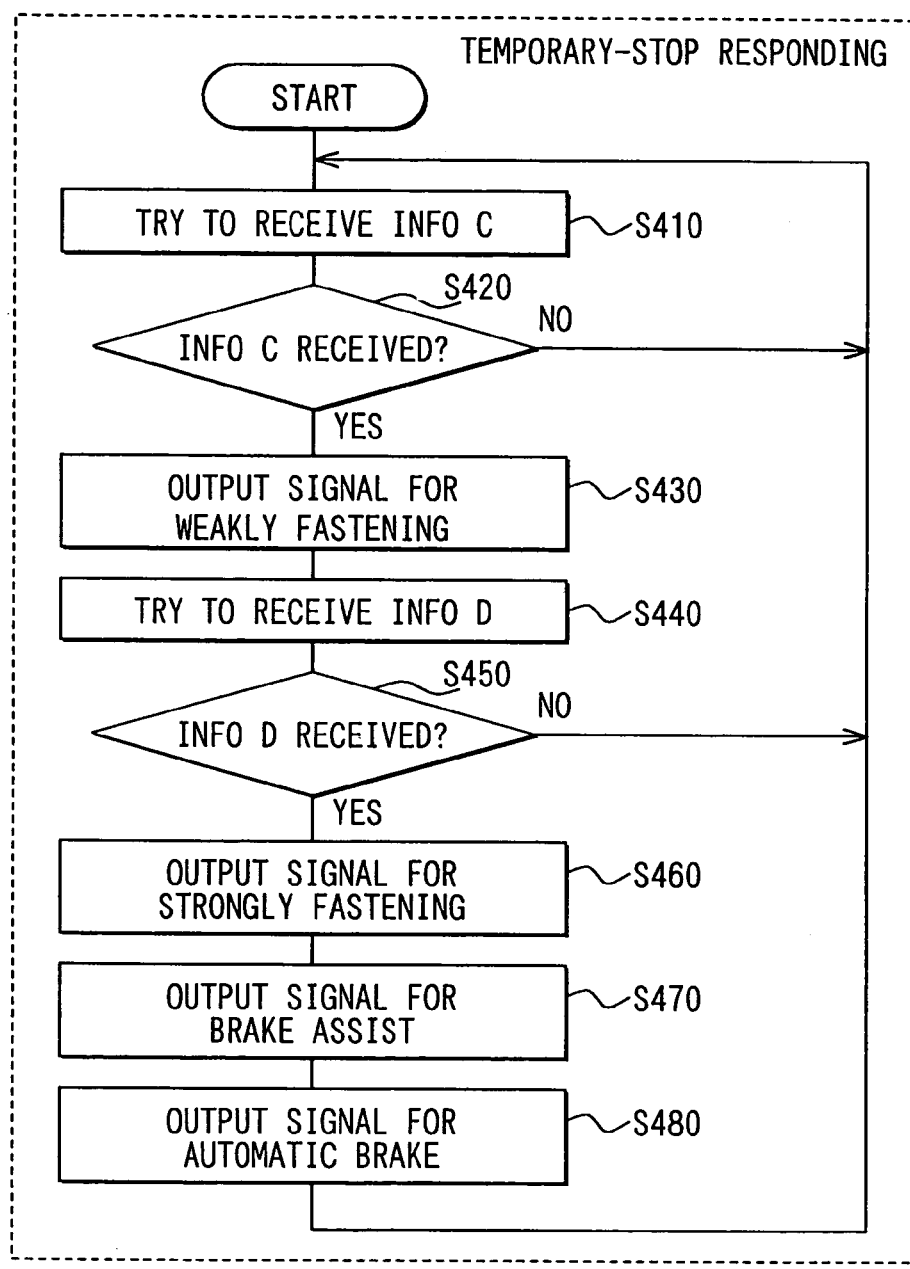
FIG. 5 is a flowchart diagram of a process responding to a temporary stop.

(4) Temporary-Stop-Responding Process (Refer to FIG. 5)

A temporary-stop-responding process is executed by the pre-crash safety control device 29. The pre-crash safety control device 29 starts this process when an ignition of the subject vehicle is turned on. Firstly, at Step S410, receiving the danger information C sent from the navigation device 11 via the in-vehicle LAN 41 is tried. As explained above, the danger information C includes at least information indicating that the subject vehicle enters a danger-avoidable region. Even when the danger information A is not received, the sequence goes to Step S420.

At Step S420, it is determined whether the danger information C is received. When the danger information C is determined to be received, the sequence goes to Step S430. When the danger information C is determined not to be received, the sequence returns to Step S410.

At Step S430, a signal for weakly fastening the seatbelt is sent to the seatbelt control device 39 via the in-vehicle LAN 41. The seatbelt control device 39 receives this signal to thereby operate the seatbelt fastening motor so that the driver recognizes fastening of the seatbelt.

At Step S440, receiving the danger information D sent from the navigation device 11 via the in-vehicle LAN 41 is tried. As explained above, the danger information D includes at least information indicating that the subject vehicle enters a danger region.

At Step S450, it is determined whether the danger information D is received. When the danger information D is determined to be received, the sequence goes to Step S460. When the danger information D is determined not to be received, the sequence returns to Step S410.

At Step S460, a signal for strongly fastening the seatbelt is sent to the seatbelt control device 39 via the in-vehicle LAN 41. The seatbelt control device 39 receives this signal to thereby operate the seatbelt fastening motor so that the driver can be fixed to the seat.

At Step S470, a signal is outputted for causing the brake control device 35 to execute a braking assist operation via the in-vehicle LAN 41. The brake control device 35 receives this signal to thereby cause the braking system to work so that a braking force with respect to the driver's braking operation is increased to more than a usual force.

At Step S480, a signal is outputted for causing the brake control device 35 to execute an automatic braking operation via the in-vehicle LAN 41. The brake control device 35 receives this signal to thereby cause the braking system to work so that a maximum braking force is attained regardless of the driver's braking operation.

(Effects)

Thus, the navigation device 11 executes region determination with respect to an obstruction based on a relative distance and a relative speed between a subject vehicle and an obstruction. The navigation device 11 thereby determines various driving states, e.g., (i) a state where a driver needs to be warned, (ii) a state where an avoidance operation needs to be started, and (iii) a state where an action anticipating a collision needs to be operated. Then a signal based on the determination results is sent to other relevant devices (e.g., the sound output device 23, the display device 25, the pre-crash safety control device 29, or the like) to thereby cause the relevant devices to properly operate. The navigation device 11 determines the driving states by synthesizing various information and then comprehensively output signals for activating other devices or signals for determining whether other devices should start. Therefore, this system is more effective and other devices more cooperatively work, than a system where each of other devices determines the operation by individually collecting information.

The navigation device 11 executes region determination with respect to a temporary stop based on a distance with the temporary-stop-required position and a speed of the subject vehicle. The navigation device 11 thereby determines various driving states, e.g., (i) a state where a driver needs to be warned, (ii) a state where a stop operation needs to be started, and (iii) a state where an emergency stop needs to be operated. Then a signal based on the determination results is sent to other relevant devices (e.g., the sound output device 23, the display device 25, the pre-crash safety control device 29, or the like) to thereby cause the relevant devices to properly operate. The navigation device 11 determines the driving states by synthesizing various information and then comprehensively output signals for activating other devices or signals for determining whether other devices should start. Therefore, this system is more effective and other devices more cooperatively work, than a system where each of other devices determines the operation by individually collecting information.

(Others)

(1) The system can further include a communications device 50 as a communicating unit so that an obstruction having a possibility of colliding with a subject vehicle can be recognized based on information obtained by this communications device 50 in addition to the information obtained as explained above. For instance, this communications device 50 performs communications with another vehicle (i.e., inter-vehicle communications), communications with a road or a roadside, or communications with an information center to thereby acquire traffic regulation or congestion information, or obstruction information obtained by another vehicle. This results in high accuracy in recognizing obstructions. Furthermore, for instance, this communications device 50 communicates using radio waves or the like with a comparable navigation device having the same function of the navigation device 11. Both navigation devices can be designed to exchange information to be used for executing the above-explained processes. In this case, each navigation device can execute the processes by recognizing obstructions other than the obstruction detected by the forward radar 27 provided in each of the vehicles. The communications device 50 can be connected directly with the navigation device, or can be connected via the in-vehicle LAN 41 with the navigation device.

(2) The system can further include an in-vehicle camera 51 photographing a forward scenery ahead of the subject vehicle. Based on an image of a forward traffic signal photographed by the camera 51, states (green, yellow, or red signal) of the traffic signal can be determined. The region determination with respect to a temporary stop can be thereby executed. In other words, when there is an intersection whose traffic signal is red ahead of the subject vehicle, this intersection is regarded as a temporary-stop-required position. The region determination with respect to a temporary stop is then executed. In this case, the navigation device 11 can recognize more temporary-stop-required positions, which enhances safety. Further, when a traffic infrastructure capable of providing the states of a traffic signal is present, it can be designed that the states of a traffic signal are obtained from the traffic infrastructure.

(3) Information of a temporary-stop-required position obtained from a map database can include the following: temporary-stop position information; vehicle-train intersection information; parking-lot site information; or cliff or drop-off information in seaside or mountainous areas. Furthermore, temporary-stop-required position information externally obtained via the communications device 50 explained above can include the following: traffic signal color information at intersections; fallen rock information; or cave-in information. The information can be used for helping prevent mis-operation (downfall or the like) in a multi-layered parking structure, a downfall to the sea in a port, or the like. Further, the information can be used for anticipating a fallen rock, a cave-in, or the like.

(4) In the above embodiment, an obstruction or a temporary-stop-required position is regarded as a prevention-necessitating target. This prevention-necessitating target has a possibility of giving danger to the subject vehicle in a case that the subject vehicle does not anticipate (or respond to) danger relating to this prevention-necessitating target. In sum, the subject vehicle is necessitated to prevent the danger relating to the prevention-necessitating target.

It will be obvious to those skilled in the art that various changes may be made in the above-described embodiments of the present invention. However, the scope of the present invention should be determined by the following claims.

What is claimed is:

1. A driving state determining system provided in a vehicle, the system comprising:
   an obtaining unit that obtains information including vehicle information of the vehicle and surrounding information for understanding a state surrounding the vehicle;
   a determining unit that
      recognizes a point where the vehicle needs to stop based on the information and executes a plurality of danger determinations that have individual determination conditions, based on a distance between the vehicle and the point and a speed of the vehicle; and
   an outputting unit that outputs to other devices a signal based on a result of a danger determination executed by the determining unit
   wherein
   the obtaining unit obtains from map data the information as to whether a temporary-stop-required point is present in an area surrounding the vehicle, and
   the determining unit recognizes the point where the vehicle needs to stop when the temporary-stop-required point is determined to be present.

2. The driving state determining system of claim 1, further comprising:
   a communicating unit that communicates with an outside of the vehicle to obtain second information,
   wherein the determining unit
      recognizes the point additionally based on the second information.

3. The driving state determining system of claim 1, wherein one of the danger determination is whether the vehicle is in a state where attention of a driver of the vehicle needs to be drawn based on the distance and the speed.

4. The driving state determining system of claim 3, wherein, when the determining unit determines that the vehicle is in a state where attention of a driver of the vehicle needs to be drawn, the outputting unit outputs the signal that includes one of:
   a signal for notifying that attention of a driver needs to be drawn;
   a signal for causing a sound output device to output a warning sound; and
   a signal for causing a display device to output a warning display.

5. The driving state determining system of claim 1, wherein one of the danger determinations is whether the vehicle is in a state where a driver of the vehicle needs to start an operation for preventing danger based on the distance and the speed.

6. The driving state determining system of claim 5, wherein, when the determining unit determines that the vehicle is in a state where a driver of the vehicle needs to start an operation for preventing danger, the outputting unit outputs the signal that includes one of:
   a signal for notifying that a driver needs to start an operation for preventing danger;
   a signal for vibrating a steering wheel of the vehicle;
   a signal for vibrating a driver's seat; and
   a signal for fastening a seatbelt to cause the driver to recognize.

7. The driving state determining system of claim 1, wherein one of the danger determinations is whether the vehicl is in a state where an ordinary braking function in a driving operation of the vehicle will unavoidably disable the vehicle from stopping before reaching the point based on the distance and the speed.

8. The driving state determining system of claim 7, wherein, when the determining unit detennines that the vehicle is in a slate where an ordinary braking function unavoidably disables the vehicle from stopping before reaching the point, the outputting unit outputs the signal that includes one of.
   a signal for notifying a result determined by the determining unit;
   a signal for forcibly braking the vehicle;

a signal for returning a driver's seat to a normal position; and a signal for fastening a seatbelt to fix the driver to the driver's seat.

9. The driving state determining system of claim 1, wherein the obtaining unit further obtains traffic regulation information relating to a traffic regulation of a road surrounding the vehicle, and wherein the determining unit executes the danger determinations additionally based on the traffic regulation information.

10. The driving state determining system of claim 1, further comprising:

a communicating unit that communicates with a comparable second driving state determining system provided in a second vehicle, wherein the obtaining unit obtains, via the communicating unit, information obtained by a comparable second obtaining unit included in the second driving state determining system.

11. The driving state determnining system of claim 1, wherein the determining unit recognizes the point where the vehicle needs to stop and which is located along the road.

12. The driving state determining system of claim 1, wherein the point where the vehicle needs to stop is fixed at a non-moving location.

* * * * *